United States Patent [19]

Field

[11] Patent Number: 4,844,515
[45] Date of Patent: Jul. 4, 1989

[54] FUEL CONNECTION
[75] Inventor: Martin J. Field, Churchville, N.Y.
[73] Assignee: General Motors Corporation, Detroit, Mich.
[21] Appl. No.: 217,092
[22] Filed: Jul. 7, 1988

Related U.S. Application Data

[63] Continuation of Ser. No. 829,159, Feb. 14, 1986, abandoned.
[51] Int. Cl.$^4$ .............................................. F16L 37/12
[52] U.S. Cl. .................................. 285/305; 285/321; 285/354; 285/379; 285/382
[58] Field of Search .............. 285/321, 351, 347, 354, 285/305, 348, 382, 379, 319, 323

[56] References Cited

U.S. PATENT DOCUMENTS

| | | | |
|---|---|---|---|
| 2,245,154 | 6/1941 | McWane | 277/208 X |
| 2,521,127 | 9/1950 | Price | 285/321 X |
| 2,538,683 | 1/1951 | Guiler et al. | 285/347 X |
| 2,599,389 | 6/1952 | Hume . | |
| 2,914,344 | 11/1959 | Anthes | 285/321 X |
| 3,027,179 | 3/1962 | Wiltse | 285/321 |
| 3,081,102 | 3/1963 | Murray et al. | 277/208 X |
| 3,667,785 | 6/1972 | Kapeker | 285/321 X |
| 3,695,639 | 10/1972 | Shire et al. | 285/351 X |
| 3,847,421 | 11/1974 | Eschbaugh et al. . | |
| 3,915,460 | 10/1975 | Kramer | 285/351 X |
| 4,191,408 | 3/1980 | Acker | 285/348 X |
| 4,193,616 | 3/1980 | Sarson et al. | 285/321 X |
| 4,278,276 | 7/1981 | Ekman | 285/321 X |
| 4,395,988 | 8/1983 | Knapp et al. . | |
| 4,423,892 | 1/1984 | Bartholomew | 285/321 X |
| 4,508,369 | 4/1985 | Mode | 285/323 X |
| 4,510,909 | 4/1985 | Elphick et al. | 123/470 |
| 4,526,411 | 7/1985 | Batholomew | 285/305 |
| 4,548,427 | 10/1985 | Press et al. | 285/321 X |
| 4,580,816 | 4/1986 | Campbell et al. | 285/321 |
| 4,645,245 | 2/1987 | Cunningham | 285/321 |

FOREIGN PATENT DOCUMENTS

| | | | |
|---|---|---|---|
| 0157512 | 9/1985 | European Pat. Off. . | |
| 1305096 | 8/1962 | France | 285/321 |
| 406764 | 3/1934 | United Kingdom . | |
| 2129081 | 5/1984 | United Kingdom . | |
| 2155576 | 9/1985 | United Kingdom | 285/321 |

OTHER PUBLICATIONS

General Motors, 1985 Firebird Service Manual, pp. 6E3-144 through 6E3-147.

Primary Examiner—Thomas F. Callaghan
Attorney, Agent, or Firm—C. K. Veenstra

[57] ABSTRACT

A fuel line receiver has a fuel passage terminating in an enlarged region. A retainer ring secures an O-ring in the enlarged region. The tip of a fuel line is curled to facilitate insertion through the retainer ring and the O-ring into the fuel passage. The O-ring sealingly engages the fuel line and the peripheral wall, and the tip of the fuel line is supported by the fuel passage and the retainer ring. A flange on the fuel line is engaged by a nut or a clip to hold the tip of the fuel line in the fuel passage.

1 Claim, 2 Drawing Sheets

FUEL CONNECTION

This is a continuatio of patent application Ser. No. 829,159, filed Feb. 14, 1986 and now abandoned.

TECHNICAL FIELD

This invention relates to a fuel connection particularly suitable for connecting a fuel line to a fuel line receiver.

BACKGROUND

In most automotive engine fuel systems, the fuel line terminates in a flare that is captured between a flared seat in a fuel line receiver and a flared nut that threads into the receiver. The nut forces the fuel line flare to engage and seal against the flared seat, thereby securing the fuel connection against loss of fuel.

SUMMARY OF THE INVENTION

This invention provides a fuel connection with an alternative construction for securing against the loss of fuel.

In the fuel connection provided by this invention, a fuel line receiver has a fuel passage terminating in an enlarged region, an O-ring is disposed in the enlarged region and retained by a retainer ring, and the tip of a fuel line is inserted through the retainer ring and the O-ring into the fuel passage. The O-ring sealingly engages both the fuel line and the peripheral wall of the enlarged region to secure against the loss of fuel. This fuel connection does not rely on the torque applied to the fuel line nut to secure the connection against the loss of fuel. In addition, this fuel connection requires less space than the flared fuel line-seat-nut connection described above, and also allows rotation of the fuel line after it is connected to the receiver. Moreover, the O-ring that provides the seal in this fuel connection is located internally and thus protected against damage during manufacture and servicing of the fuel system.

The details as well as other features and advantages of several embodiments of this invention are set forth in the remainder of the specification and are shown in the drawings.

THE PREFERRED EMBODIMENTS

Figure 1:
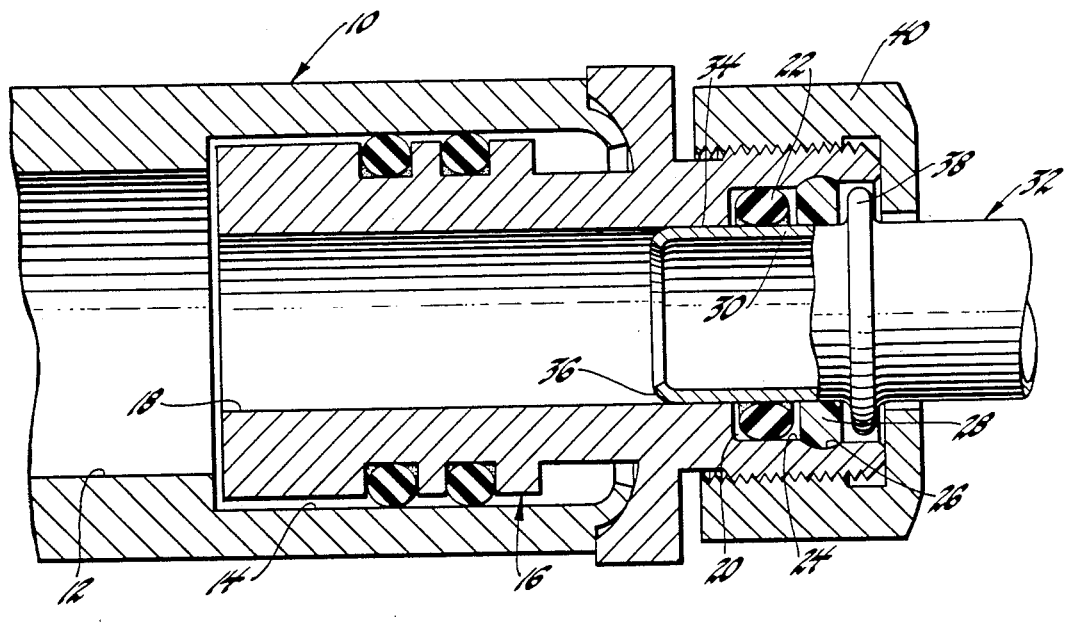
FIG. 1 is an enlarged sectional view showing the details of construction of one embodiment of a fuel connection provided by this invention.

Referring first to FIG. 1, the body 10 of a fuel rail in a multi-point fuel injection system for an automotive internal combustion engine has a fuel passage 12 terminating in a cylindrical bore 14. A fuel line fitting or receiver 16 projects from bore 14 and is staked to body 10.

Fuel line receiver 16 has a fuel passage 18 extending from passage 12 and terminating in an enlarged counter-bored region 20. An O-ring 22 is disposed in sealing engagement with the peripheral wall 24 of enlarged region 20, and a peripheral groove 26 is formed in wall 24 outwardly of O-ring 22.

A retainer ring 28 is received in groove 26. Retainer ring 28 is formed of a material, such as a DuPont Zytel plastic, that compresses as retainer ring 28 is inserted into the open end of region 20 and then expands into groove 26. Retainer ring 28 is thereby secured in the open end of enlarged region 20 to retain and protect O-ring 22.

The tip 30 of a tubular fuel line 32 is inserted through retainer ring 28 and O-ring 22 into fuel passage 18 and is supported by passage 18 and by retainer ring 28. Tip 30 has a cylindrical sealing surface 34 that is engaged by O-ring 22 to secure against loss of fuel from the connection between fuel line 32 and fuel line receiver 16. The end 36 of tip 30 is curled inwardly as shown to ensure that no sharp edges will contact O-ring 22 as the tip is inserted through the O-ring.

A flange 38 on fuel line 32 is received in enlarged region 20 outwardly of retainer ring 28. Flange 38 engages a nut 40 threaded on fuel line receiver 16 to hold fuel line 32 in place.

It will be appreciated that snap rings and other kinds of retainer rings could be employed in place of retainer ring 28. However, retainer ring 28 is particularly suitable because of the support it provides for fuel line 32 and the protection it provides for O-ring 22.

Figure 2:
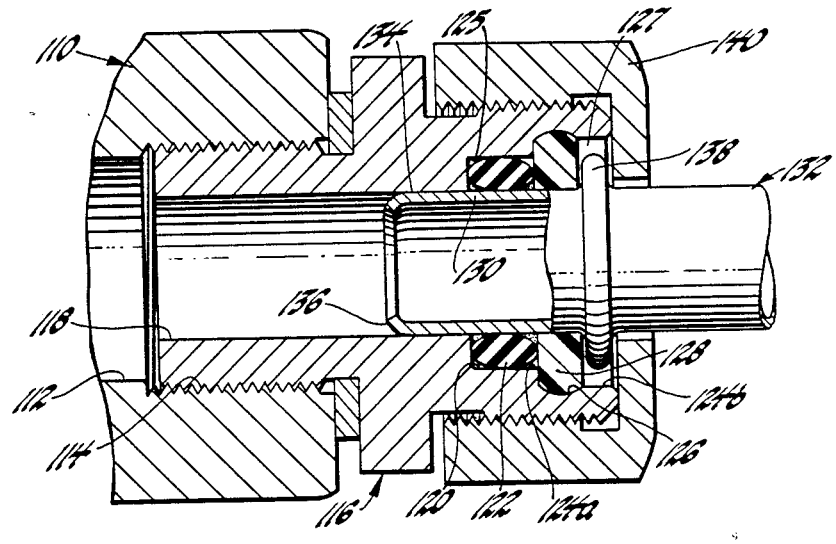
FIG. 2 is an enlarged sectional view showing the details of construction of a second embodiment of a fuel connection provided by this invention.

Referring now to FIG. 2, the body 110 of a fuel rail in a multi-point fuel injection system for an automotive internal combustion engine has a fuel passage 112 terminating in a threaded bore 114. A fuel line fitting or receiver 116 is threaded into bore 114.

Fuel line receiver 116 has a fuel passage 118 extending from passage 112 and terminating in an enlarged counter-bored region 120. An O-ring 122 is disposed in sealing engagement with the peripheral wall 124a of an inner portion 125 of enlarged region 120, and a peripheral groove 126 is formed in the peripheral wall 124b of an outer portion 127 of enlarged region 120.

A retainer ring 128 is received in groove 126. Retainer ring 128 is formed of a material, such as a DuPont Zytel plastic, that compresses as retainer ring 128 is inserted into the outer portion 127 of enlarged region 120 and then expands into groove 126. Retainer ring 128 is thereby secured in the outer portion 127 of enlarged region 120 to retain and protect O-ring 122.

The tip 130 of a tubular fuel line 132 is inserted through retainer ring 128 and O-ring 122 into fuel passage 118 and is supported by passage 118 and by retainer ring 128. Tip 130 has a cylindrical sealing surface 134 that is engaged by O-ring 122 to secure against loss of fuel from the connection between fuel line 132 and fuel line receiver 116. The end 136 of tip 130 is curled inwardly as shown to ensure that no sharp edges will contact O-ring 122 as the tip is inserted through the O-ring.

A flange 138 on fuel line 132 is received in the outer portion 127 of enlarged region 120 outwardly of retainer ring 128. Flange 138 engages a nut 140 threaded on fuel line receiver 116 to hold fuel line 132 in place.

Figure 3:
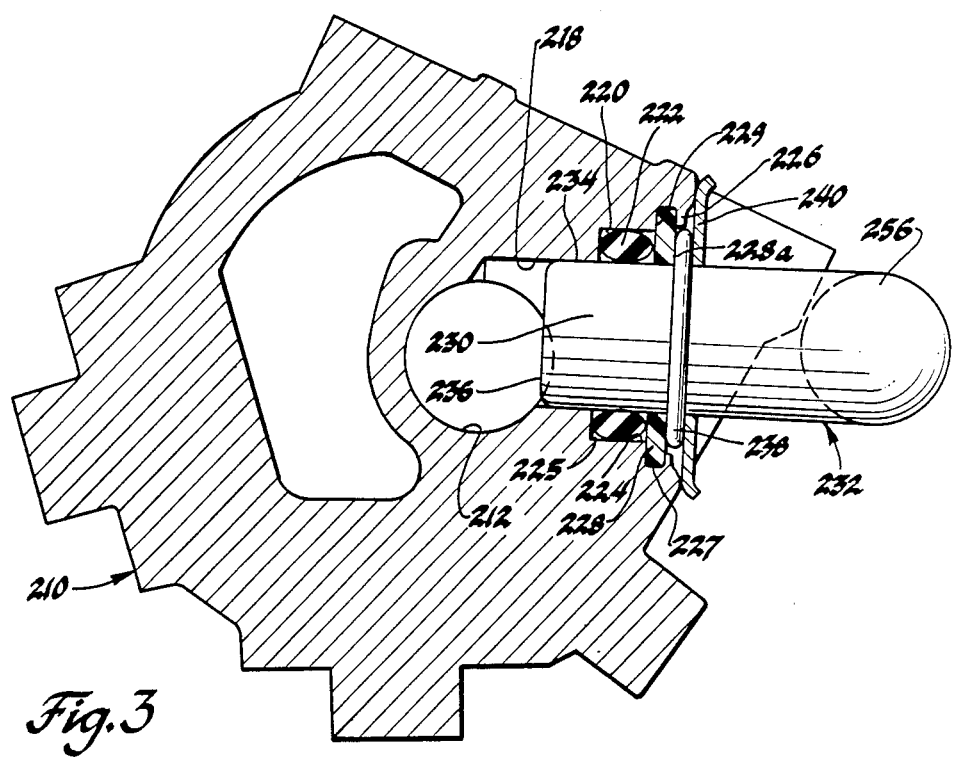
FIG. 3 is an enlarged sectional view showing the details of construction of a third embodiment of a fuel connection provided by this invention.

Referring now to FIG. 3, the body 210 of a fuel rail in a multi-point fuel injection system for an automotive internal combustion engine has an axial fuel passage 212 intersected by a transverse fuel passage 218 and forms a fuel line receiver.

Passage 218 terminates in an enlarged counter-bored region 220. An O-ring 222 is disposed in sealing engagement with the peripheral wall 224 of an inner portion 225 of enlarged region 220, and a retainer ring 228 is received in an outer portion 227 of enlarged region 220.

Retainer ring 228 abuts a shoulder 229 between the inner and outer portions 225 and 227 of enlarged region 220, and a lip 226 on body 210 is staked or deformed over the peripheral portion of the outer surface 228a of retainer ring 228. Retainer ring 228 is thereby secured in the outer portion 227 of enlarged region 220 to retain and protect O-ring 222.

The tip 230 of a tubular fuel line 232 is inserted through retainer ring 228 and O-ring 222 into passage 218 and is supported by passage 218 and by retainer ring 228. Tip 230 has a cylindrical sealing surface 234 that is engaged by O-ring 222 to secure against loss of fuel from the connection between fuel line 232 and body 210. The end 236 of tip 230 is curled inwardly as shown to ensure that no sharp edges will contact O-ring 222 as the tip is inserted through the O-ring.

A flange 238 on fuel line 232 is received in the outer portion 227 of enlarged region 220 outwardly of retainer ring 228. Flange 238 engages a clip 240 secured to body 210 to hold fuel line 232 in place.

Figure 4:
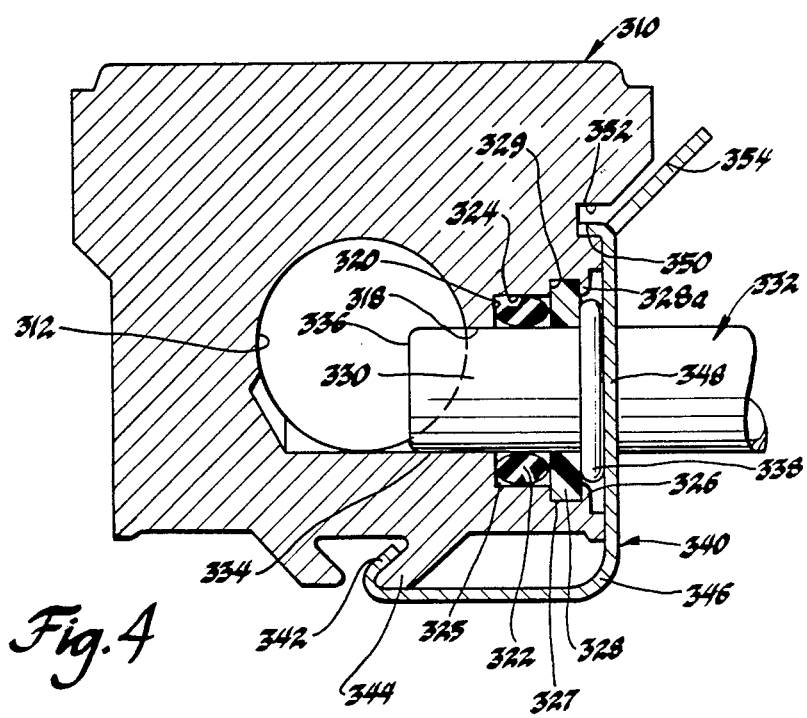
FIG. 4 is an enlarged sectional view showing the details of construction of a fourth embodiment of a fuel connection provided by this invention.

Referring now to FIG. 4, the body 310 of a fuel rail in a multi-point fuel injection system for an automotive internal combustion engine has an axial fuel passage 312 intersected by a transverse fuel passage 318 and forms a fuel line receiver.

Passage 318 terminates in an enlarged counter-bored region 320. An O-ring 322 is disposed in sealing engagement with the peripheral wall 324 of an inner portion 325 of enlarged region 320, and a retainer ring 328 is received in an outer portion 327 of enlarged region 320.

Retainer ring 328 abuts a shoulder 329 between the inner and outer portions 325 and 327 of enlarged region 320, and a lip 326 on body 310 is staked or deformed over the peripheral portion of the outer surface 328a of retainer ring 328. Retainer ring 328 is thereby secured in the outer portion 327 of enlarged region 320 to retain and protect O-ring 322.

The tip 330 of a tubular fuel line 332 is inserted through retainer ring 328 and O-ring 322 into fuel passage 318 and is supported by passage 318 and by retainer ring 328. Tip 330 has a cylindrical sealing surface 334 that is engaged by O-ring 322 to secure against loss of fuel from the connection between fuel line 332 and body 310. The end 336 of tip 330 is curled inwardly as shown to ensure that no sharp edges will contact O-ring 322 as the tip is inserted through the O-ring.

A flange 338 on fuel line 332 is received in the outer portion 327 of enlarged region 320 outwardly of retainer ring 328. Flange 338 engages a spring clip 340.

Clip 340 has a hook 342 secured over a projection 344 on body 310. A bend 346 in clip 340 forms an acute angle when clip is not installed on body 310, but when installed on body 310, bend 346 is stretched to approximately a right angle. Clip 340 has a pair of arms 348 embracing fuel line 332 and engaging flange 338, and each arm includes a tang 350 received in a notch 352 formed in body 310. Tangs 350 and hook 342 secure clip 340 to body 310, and clip 340 thereby holds fuel line 332 in place. A finger 354 may be provided on each arm 348 to allow disengagement of clip 340 from body 310.

It will be noted that, in each embodiment, the fuel line may be rotated after it is inserted and secured in the fuel line receiver. Accordingly, the fuel line may be assembled with the fuel rail body before the fuel rail body is installed on the engine, and the fuel line may then be rotated to properly align its other end.

It also will be noted that this fuel line connection allows the fuel line to have a bend, such as 256 in FIG. 3, very close to the fuel body if such should be required by the particular application.

The embodiments of the invention in which an exclusive property or privilege is claimed are defined as follows:

1. A fuel connection comprising a fuel line receiver having a fuel passage and an enlarged region at one end of said passage, a fuel line having a tip received in said passage and a flange received in said region and a sealing surface disposed in said region between said flange and said tip, said region having a peripheral wall, an O-ring sealingly engaging said wall and said surface, means secured to said receiver and engaging said flange for holdig said fuel line in place, said wall having an annular groove between said O-ring and said flange, and a retainer ring surrounding said fuel line and received in said groove, said wall further having a lip staked over the peripheral portion of said retainer ring to form a portion of said groove and retain said retaining ring and thus said O-ring in said region, and wherein said fuel line tip is supported against lateral movement by said passage and said retainer ring.

* * * * *